(No Model.)
J. W. FISHER.
SCHOOL SEAT HINGE.
No. 518,988. Patented May 1, 1894.
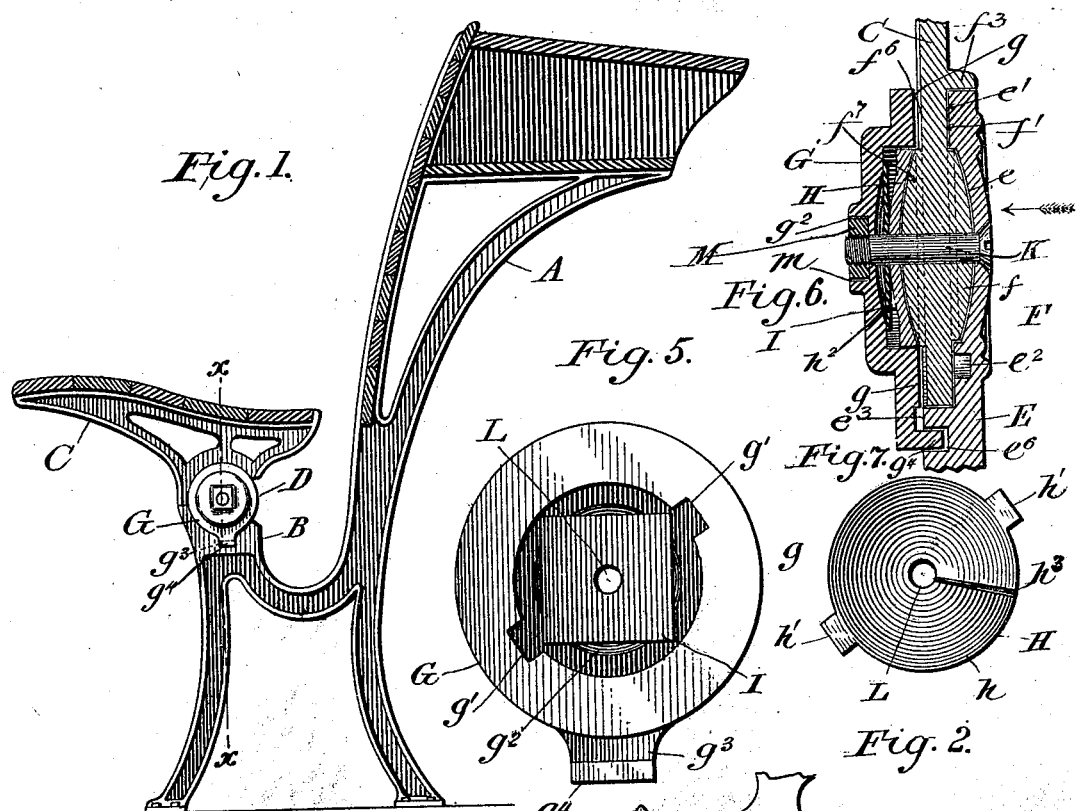
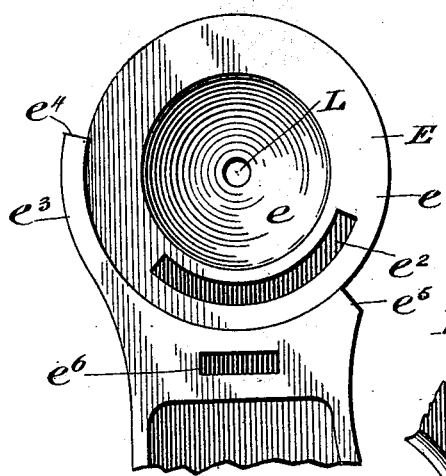
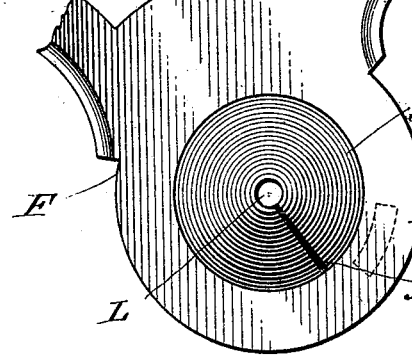
Witnesses:
Inventor:
James William Fisher
By A. Hess
his Attorney

UNITED STATES PATENT OFFICE.

JAMES WILLIAM FISHER, OF PIQUA, OHIO.

SCHOOL-SEAT HINGE.

SPECIFICATION forming part of Letters Patent No. 518,988, dated May 1, 1894.

Application filed December 18, 1893. Serial No. 493,937. (No model.)

*To all whom it may concern:*

Be it known that I, JAMES WILLIAM FISHER, a citizen of the United States, residing at Piqua, in the county of Miami and State of Ohio, have invented certain new and useful Improvements in School-Seat Hinges; and I do hereby declare the following to be a full, clear, and exact description of the invention, such as will enable others skilled in the art to which it appertains to make and use the same.

My invention relates to improvements in the construction of joints adapted for school seats, and more especially to that class wherein the friction of the bearings is increased as the seat arm reaches near its limit of travel, in order to obviate the noise incident to the banging due to the sudden stoppage of said arm, and to ease the strain on the parts as is well known.

The objects of my invention are to distribute equally the friction over bearing surfaces of the members of the joint, to simplify the construction, to make the parts easily attachable and detachable, and to improve the construction generally.

The objects of my invention are accomplished by the features of construction and arrangements of devices, as hereinafter described and claimed, reference being made to the accompanying drawings, in which—

Figure 1 is a side elevation of a school desk showing a seat connected thereto by my improved ball-disk joint. Fig. 2 is a side view of the pivoted or rocking member of the ball-disk joint which is connected to the seat-arm. Fig. 3 is a similar view of the opposite side of said member. Fig. 4 is an inside elevation of the socket which is connected to the desk standard. Fig. 5 is an inside elevation of the cap-piece with a flat spring friction plate seated therein, and the friction disk removed. Fig. 6 is a section through the joint on the line $x$—$x$ Fig. 1. Fig. 7 is a side elevation of the friction-disk looking in the direction of the arrow Fig. 6.

Like reference letters refer to like parts in the several figures.

A, represents a frame of the desk and B a standard to which the seat arm C is connected by means of a ball-disk joint D. The ball disk joint or hinge D is composed of a socket piece E, connected to or preferably cast integral with the standard B; a knuckle or ball like member F which is connected or cast integral with the seat arm C and turns in said socket E when the seat and arm are turned up or down; a cap piece G in which is contained a friction disk H and a flat spring metal plate I; and a securing bolt K having a suitable locking nut. The socket piece E, is a circular metal plate which has a central concave depression or recess $e$ for the reception of an approximately hemi-spherical protuberance on the knuckle or member F. Surrounding the depression $e$ is a flat circular bearing surface $e'$, for the member F. The socket piece E is provided with a segmental recess or slot $e^2$, for the reception of a similarly shaped lug on the knuckle or member F, as hereinafter described. Partially surrounding the flat circular bearing surface $e'$, is a segmental flange or rim $e^3$, which forms a peripheral bearing surface for the knuckle or member F. The segmental rim $e^3$ terminates in two shoulders $e^4$, $e^5$, which contact with similar shoulders on the knuckle F when the seat is raised or lowered. The socket piece E, or the standard on which said piece is secured is provided with a recess $e^6$, for the reception of a locking lug on the cap piece as hereinafter described. The knuckle or ball-like member F which fits and turns in the socket piece E, is provided on one side (as shown in Fig. 2) with a hemispherical like protuberance $f$, a flat circular bearing surface $f'$, a segmental lug $f^2$, and a segmental rim or flange $f^3$, which terminates in the shoulders $f^4$ and $f^5$. The member F on its opposite side (as shown in Fig. 3,) is provided with a flat circular bearing surface $f^6$ and a protuberance $f^7$, similar to the part $f$. The hemi-spherical protuberance $f^7$ is provided with a swell or bulging portion $f^8$, for the purpose hereinafter stated. The cap piece G has on its rim a flat circular bearing surface $g$, on which the circular flange $f^6$ of the knuckle or ball member of the joint bears. On the inner side of the rim of the cap and extending down into the crown thereof are two square cut away portions or notches $g'$, $g'$. These notches are located opposite to each other and are for the purpose of receiving projecting lugs on the friction disk H. The inner side of the crown of the cap is provided with a slight depression or recess (as shown in Figs. 5 and 6) for the purpose of allowing the flat spring plate I, to yield therein. Extending from the cap is a tang $g^3$, which is provided with a locking lug $g^4$, which fits in the recess $e^6$, in the standard of the desk and prevents the cap from rotation. The friction disk H is concave on the side $h$, which bears against the protuberance $f^7$ on the knuckle or ball like member F, of the hinge joint. The friction disk is provided with two oppositely arranged rectangular lugs $h'$, $h'$, which fit in the notches $g'$, $g'$ in the cap G. The notches are of sufficient depth to allow a slight lateral or sliding movement of the friction disk in the cap but they lock the disk in the cap and prevent the disk from rotation. The side $h^2$ of the disk toward the crown of the cap is slightly convex as shown in Fig. 6. Said side $h^2$ of the disk bears upon and is pressed against the spring I in the cap when the member F is moved. The concave side of the disk is provided with a ridge or swell $h^3$ shown in Fig. 7. The arrangement of the ridge or swell on the concave side of the friction disk and the swell on the hemi-spherical portion $f^7$, is such that when the seat arm, to which the knuckle or member F is attached, nearly reaches its limits of movement in either direction the friction disk is forced laterally in the cap and bears with increased friction against the flat metal spring and slows down the movement of the seat arm.

Each of the several parts of the ball-disk joint is provided with a circular opening L. The bolt K extends through this opening and serves to retain the several parts together. The bolt is preferably provided with a nut M, which is seated and prevented from rotation by a rectangular recess $m$, in the cap G.

Having fully described my invention, what I claim, and desire to secure by Letters Patent, is—

1. In a school desk joint, the combination of a socket-piece secured to the desk standard and provided with a concavity in its center, a flat bearing surface surrounding the concavity, a segmental slot or recess in said bearing surface, and a rim partially surrounding the same, a pivoted or rocking member connected to the seat arm having on one side a ball like protuberance to fit into the concavity in the socket-piece, a flat circular bearing surface, a lug thereon to engage the slot in the socket-piece, and a segmental rim to bear against the periphery of the socket piece, and on its other side a similar ball-like protuberance having a cam or swell, a cap-piece having a flat circular bearing surface, a projecting tang having a lug which extends into a recess in the standard and prevents the rotation of the cap, and notches in the crown, a concavo-convex friction disk having projecting lugs which extend into the notches in the crown of the cap, a projecting cam or swell on the concave side, and a spring metal plate located between the friction disk and the top of the cap, and means such as a bolt for securing all the parts together, substantially as set forth.

2. The combination of a socket-piece having a segmental slot, a pivoted or rocking member having a ball like protuberance to turn in said socket piece, a lug to engage in the slot, and a similar protuberance on its other side provided with a cam or swell, a friction disk fitting over said protuberance and provided with a corresponding cam or swell, a spring bearing against said disk, a cap-piece inclosing said disk and spring, and means for securing said parts together, substantially as described.

3. The combination of a socket-piece, a pivoted or rocking member fitting in said socket-piece and having a ball like protuberance on each of its sides, a concave friction disk fitting over one of the ball like protuberances, a spring bearing on the friction disk, a cap piece, and means for securing the parts together, substantially as described.

4. The combination of a socket piece, a pivoted or rocking member having a semi-spherical or ball like protuberance fitting in said socket-piece and a corresponding ball like protuberance provided with a swell on the other side of said member, a concave friction disk provided with a swell fitting over the protuberance with the swell thereon, a spring pressing against the friction-disk, a cap-piece, and means for securing said parts together substantially as described.

5. In a school desk hinge or joint, the combination of a socket-piece, a pivoted or rocking member having on one side a semi-spherical or ball-like protuberance fitting a depression in the socket-piece, a similar protuberance having a swell on the other side, a friction disk provided on one side with a swell, a spring bearing against the other side of the disk, and a cap-piece having a crown inclosing the friction disk and spring, and flanged rim entirely surrounding the crown and bearing against the flat surface of the rocking member, all substantially as described.

6. In a school desk joint the combination of a standard having a socket piece, a seat arm having a member to turn in said socket-piece provided with a ball like projection on each of its sides, a spring pressed friction disk, suitable swells on the ball and friction disk for increasing the friction, a cap piece and means for securing said parts in place.

In testimony whereof I affix my signature in presence of two witnesses.

JAMES WILLIAM FISHER.

Witnesses:
A. J. HESS,
M. G. SMITH.